(12) United States Patent
Singletary (10) Patent No.: US 10,981,725 B2
(45) Date of Patent: Apr. 20, 2021

(54) AUTOMATED GUIDED VEHICLE TRANSPORT DEVICE

(71) Applicant: The Boeing Company, Chicago, IL (US)

(72) Inventor: Jason Robert Singletary, Everett, WA (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 16/443,486

(22) Filed: Jun. 17, 2019

(65) Prior Publication Data

US 2020/0391945 A1    Dec. 17, 2020

(51) Int. Cl.
*B65G 1/137*    (2006.01)
*B65G 1/04*    (2006.01)

(52) U.S. Cl.
CPC ......... *B65G 1/1375* (2013.01); *B65G 1/0492* (2013.01)

(58) Field of Classification Search
CPC combination set(s) only.
See application file for complete search history.

(56) References Cited

U.S. PATENT DOCUMENTS

| | | | |
|---|---|---|---|
| 5,826,893 A * | 10/1998 | Snoeyenbos | B62B 5/0083 280/43 |
| 7,478,704 B2 | 1/2009 | Church | |
| 8,172,255 B1 | 5/2012 | Martin | |
| 8,282,111 B2 | 10/2012 | Hailston et al. | |
| 2003/0180130 A1 | 9/2003 | Lutz | |
| 2016/0244263 A1 | 8/2016 | Kolharkar et al. | |
| 2017/0327359 A1* | 11/2017 | Azad | B66F 9/072 |

* cited by examiner

*Primary Examiner* — Kyle O Logan
(74) *Attorney, Agent, or Firm* — Armstrong Teasdale LLP (57) ABSTRACT

A transport device for lifting an automated guided vehicle (AGV) from a floor surface includes a first frame including a plurality of first frame members and a plurality of wheels coupled to the plurality of first frame members, wherein the plurality of wheels are configured to contact the floor surface. The transport device also includes a second frame including a plurality of second frame members, wherein the second frame is configured to mechanically engage the AGV. The transport device further includes a lifting system configured to move the second frame and the AGV with respect to the first frame between a first position where the AGV contacts the floor surface and a second position where the AGV is spaced from the floor surface.

20 Claims, 8 Drawing Sheets

AUTOMATED GUIDED VEHICLE TRANSPORT DEVICE

FIELD

The following disclosure relates generally to automated guided vehicles and, more particularly, a transport device for lifting automated guided vehicles from a floor surface.

BACKGROUND

At least some known manufacturing facilities use automated guided vehicles (AGVs) to transport materials between locations on the work floor. Such AGVs are heavy devices with a low-profile that travel along predetermined routes along the work floor and are not capable of deviating from the routes independently. In some cases, such as in emergency situations, changes to the work floor configuration, returning to a charging station, to perform maintenance, or to use the AGV on a different route, it is desired to move the AGVs from their predetermined routes. It may be further desired to move a non-functioning AGV from its route since other AGVs follow the same predetermined route and will be unable to deliver or pick up their loads.

However, due to the weight and shape of at least some known AGVs, moving the AGVs requires multiple people to push the AGV off the route. Alternatively, a tool may be used to move the AGVs. However, current tools are complicated and do not completely lift the AGVs off the floor to allow for maintenance of the AGVs. Further, engagement of the AGVs with current tools may result in shortening the service lifetime of various AGV components. Furthermore, at least one specialized tool does not have the capability to lift the AGV to perform maintenance, such as removing debris from the AGV wheels.

BRIEF DESCRIPTION

In one example, a transport device for lifting an automated guided vehicle (AGV) from a floor surface is provided. The transport device includes a first frame including a plurality of first frame members and a plurality of wheels coupled to the plurality of first frame members, wherein the plurality of wheels are configured to contact the floor surface. The transport device also includes a second frame including a plurality of second frame members, wherein the second frame is configured to mechanically engage the AGV. The transport device further includes a lifting system configured to move the second frame and the AGV with respect to the first frame between a first position where the AGV contacts the floor surface and a second position where the AGV is spaced from the floor surface.

In another example, a material transport system is provided. The material transport system includes an automated guided vehicle (AGV) configured to follow a predetermined path on a floor surface. The material transport system also includes a first frame including a plurality of first frame members and a plurality of wheels coupled to the plurality of first members, wherein the plurality of wheels are configured to contact the floor surface. The material transport system further includes a second frame positioned within the first frame and coupled to the AGV. A lifting system is coupled to the first frame and to the second frame and is configured to move the second frame and the AGV with respect to the first frame between a first position where the AGV contacts the floor surface and a second position where the AGV is spaced from the floor surface.

In yet another example, a method of assembling a material transport system for transporting material along a floor surface is provided. The method includes positioning a second frame within a first frame and connecting a lifting system to the first frame and to the second frame. The method also includes mechanically engaging the second frame to an automated guided vehicle (AGV), wherein the lifting system is configured to move the second frame and the AGV with respect to the first frame between a first position where the AGV contacts the floor surface and a second position where the AGV is spaced from the floor surface.

The features, functions, and advantages that have been discussed can be achieved independently in various examples of the present disclosure or may be combined in yet other examples, further details of which can be seen with reference to the following description and drawings.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

The implementations described herein relate to automated guided vehicles and, more particularly, a transport device for lifting automated guided vehicles (AGVs) from a floor surface. More specifically, in the exemplary implementation, the transport device includes a first frame including a plurality of first frame members and a plurality of wheels coupled to the plurality of first frame members, wherein the plurality of wheels are configured to contact the floor surface. The transport device also includes a second frame including a plurality of second frame members, wherein the second frame is configured to mechanically engage the AGV. The transport device further includes a lifting system configured to move the second frame and the AGV with respect to the first frame between a first position where the AGV contacts the floor surface and a second position where the AGV is spaced from the floor surface.

The transport device provides a safe and ergonomic way to lift and move the AGV off of its predetermined route. As described herein, the AGV may need to be moved to allow access for other vehicles, to perform maintenance on the AGV, to change the predetermined route due to a reconfiguration of the work floor, or to switch the AGV to a different route. The clamps that attach the transport device to the AGV are easily operable to remove the transport device from the AGV, or to allow the transport device to remain connected to the AGV as the AGV travels along its route. When the transport device remains with the AGV, the transport device can be used to store components and tools for delivery and is easily seen to prevent accidental contact with workers. Additionally, the control device that controls operation of the actuators can be easily manipulated by a single technician. Such ease of operation facilitates easily and quickly removing the AGV from the route to allow ingress/egress or to quickly perform AGV maintenance, such as removing debris from the AGV wheels.

Figure 1:
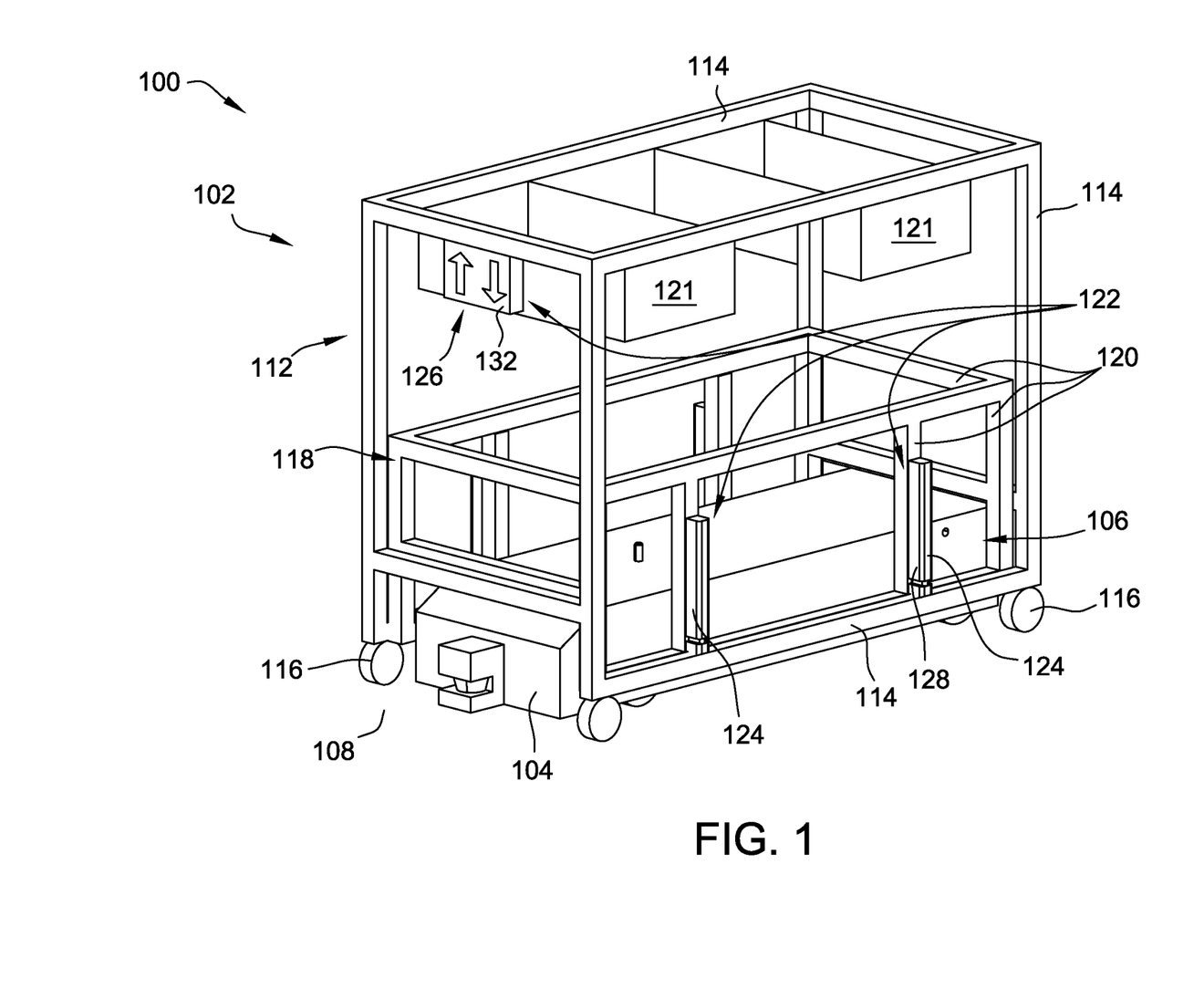
FIG. 1 is a perspective view of a material transport system illustrating a transport device and an automated guided vehicle (AGV) with the AGV in a first position on a floor surface.
Figure 2:
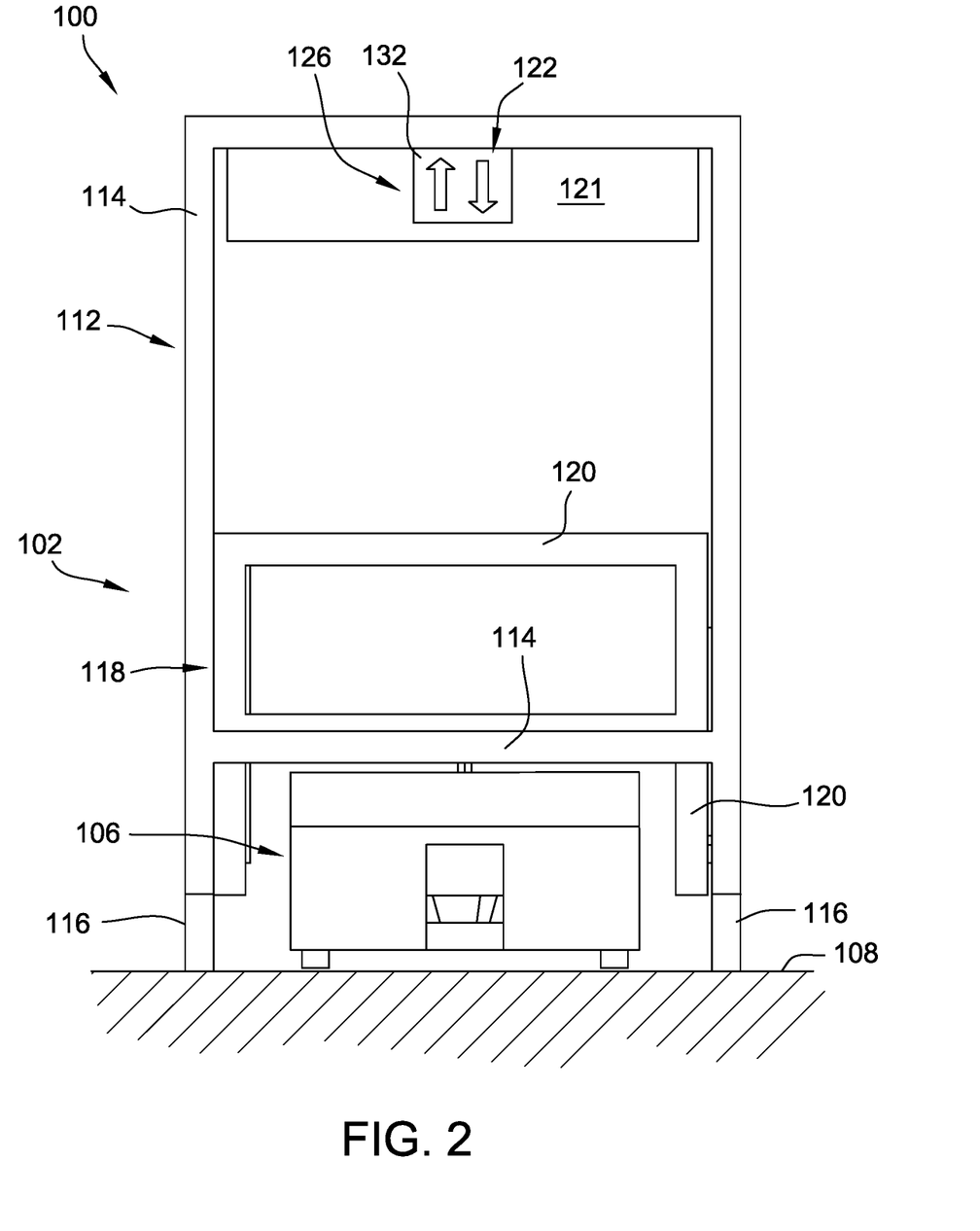
FIG. 2 is a front view of the material transport system of FIG. 1 illustrating the AGV in the first positon.
Figure 3:
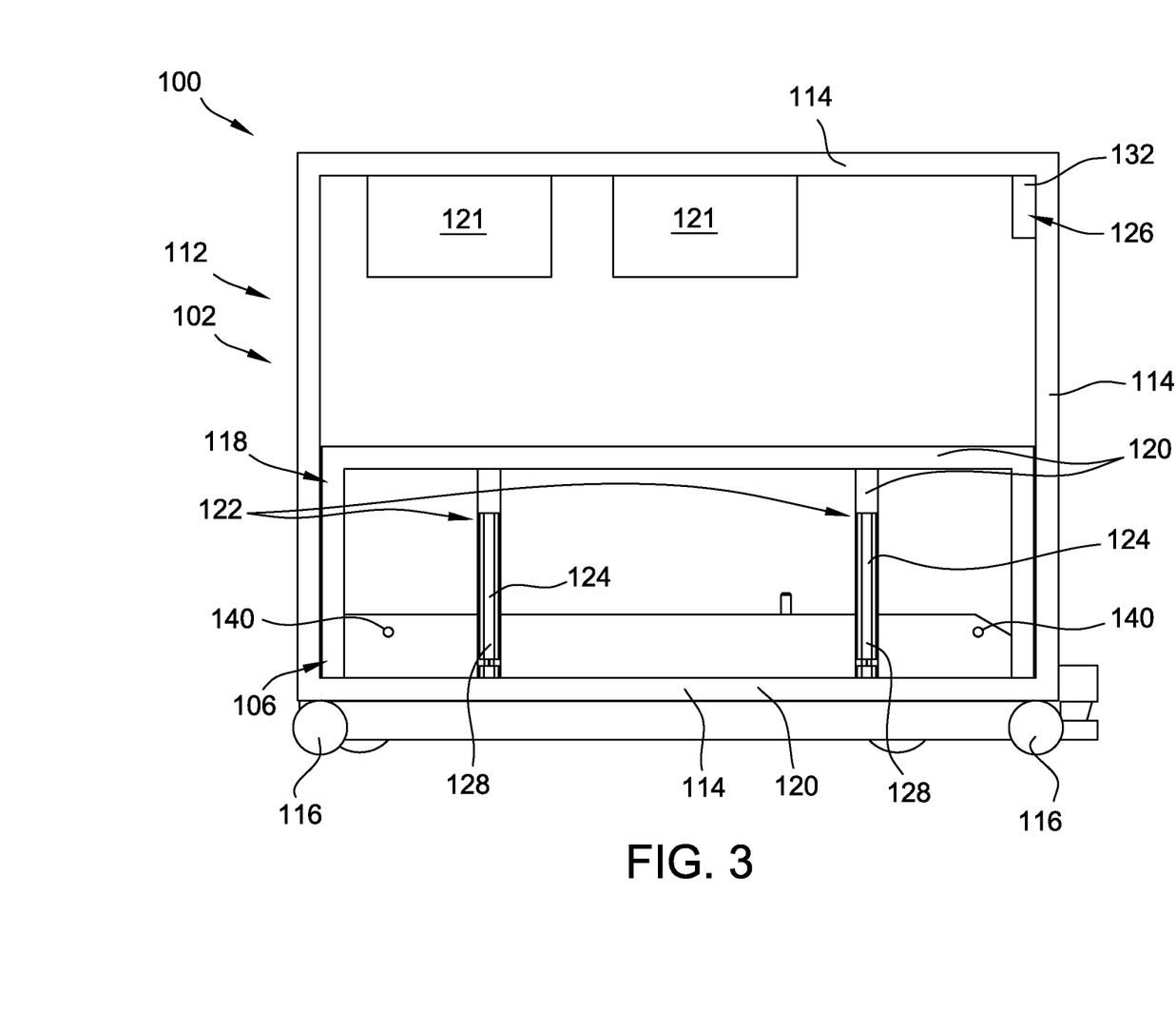
FIG. 3 is a side view of the material transport system of FIG. 1 illustrating the AGV in the first positon.
Figure 4:
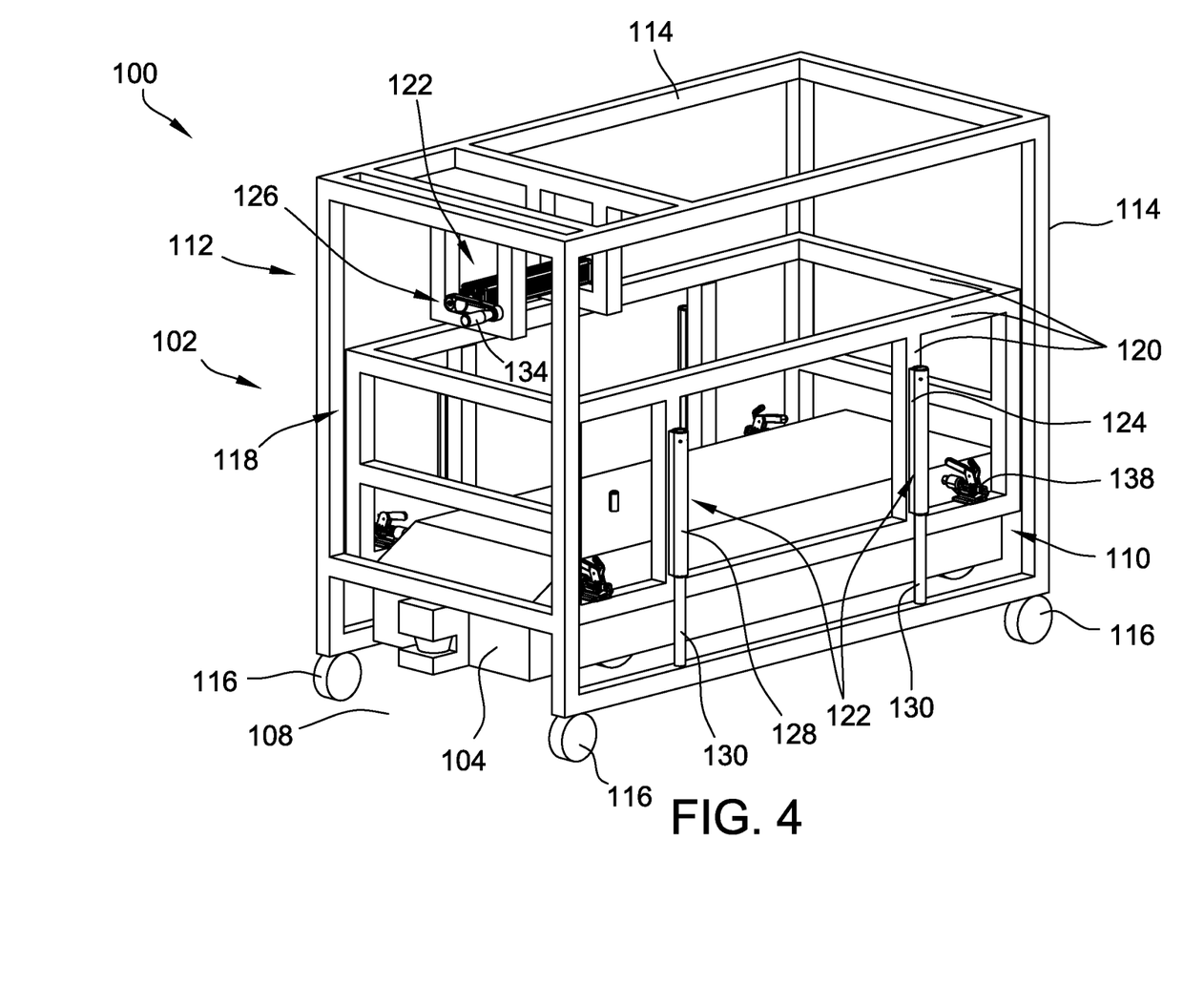
FIG. 4 is a perspective view of the material transport system of FIG. 1 illustrating the AGV in a second positon spaced from the floor surface.
Figure 5:
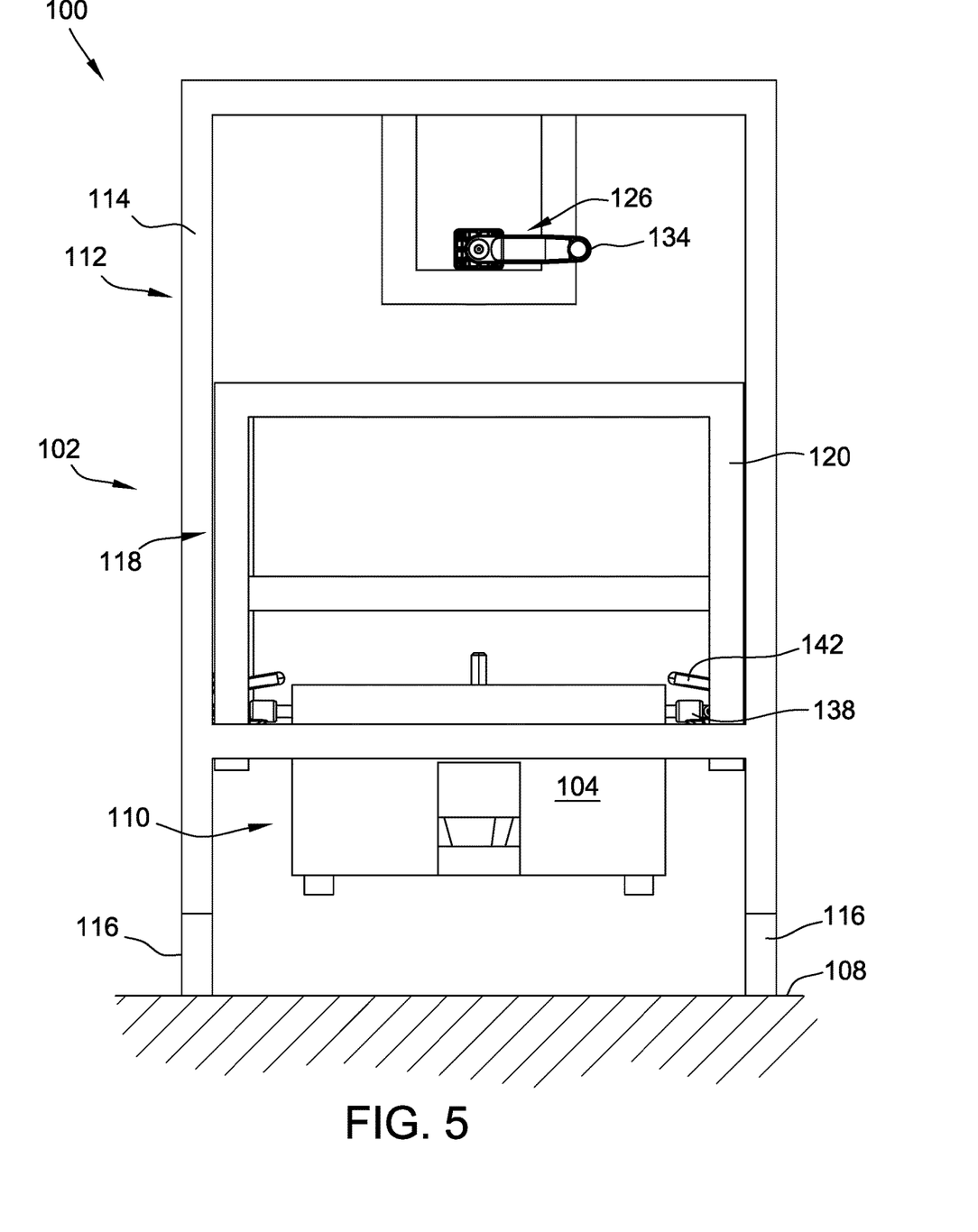
FIG. 5 is a front view of the material transport system of FIG. 1 illustrating the AGV in the second positon.
Figure 6:
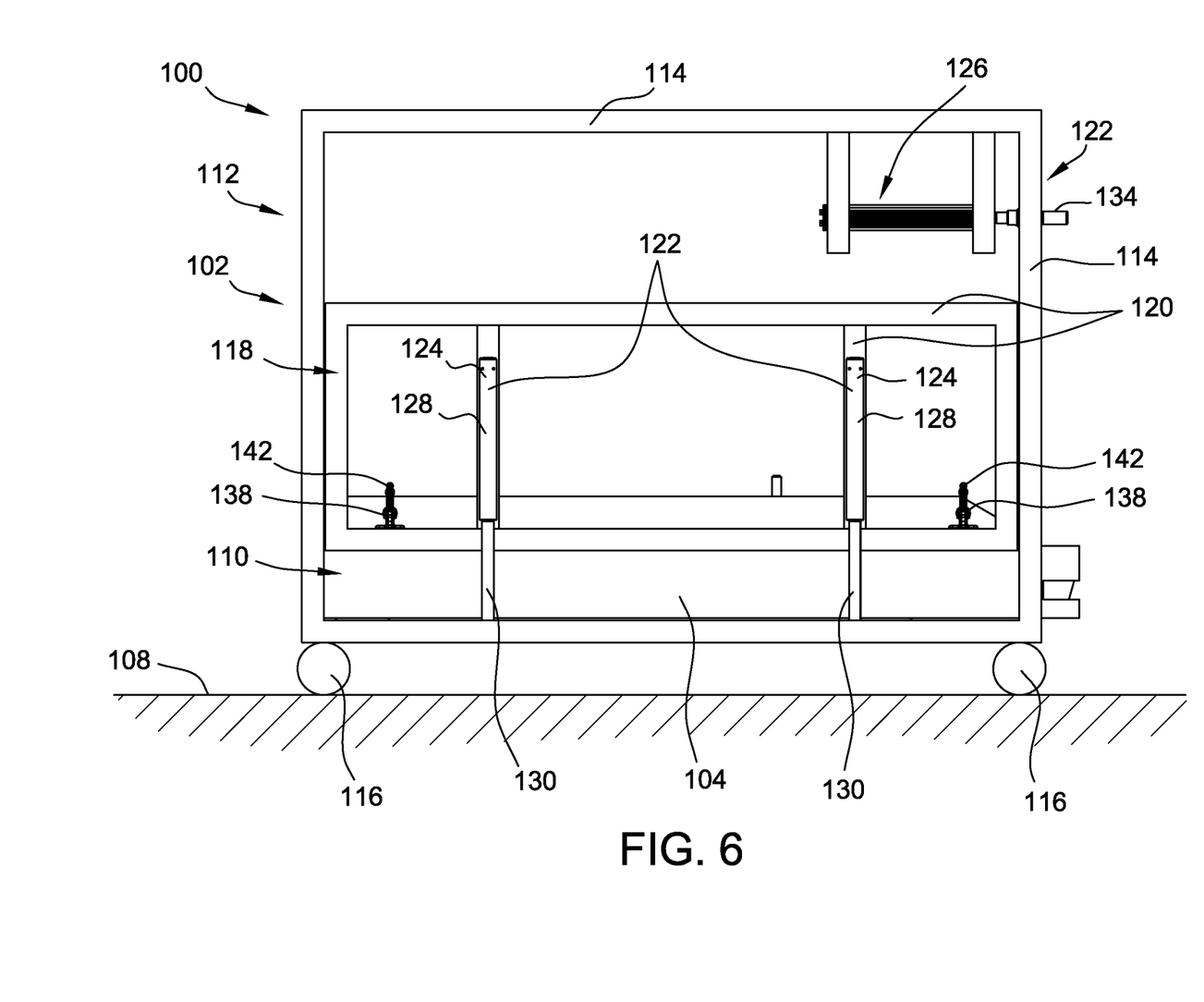
FIG. 6 is a side view of the material transport system of FIG. 1 illustrating the AGV in the second positon.
Figure 7:
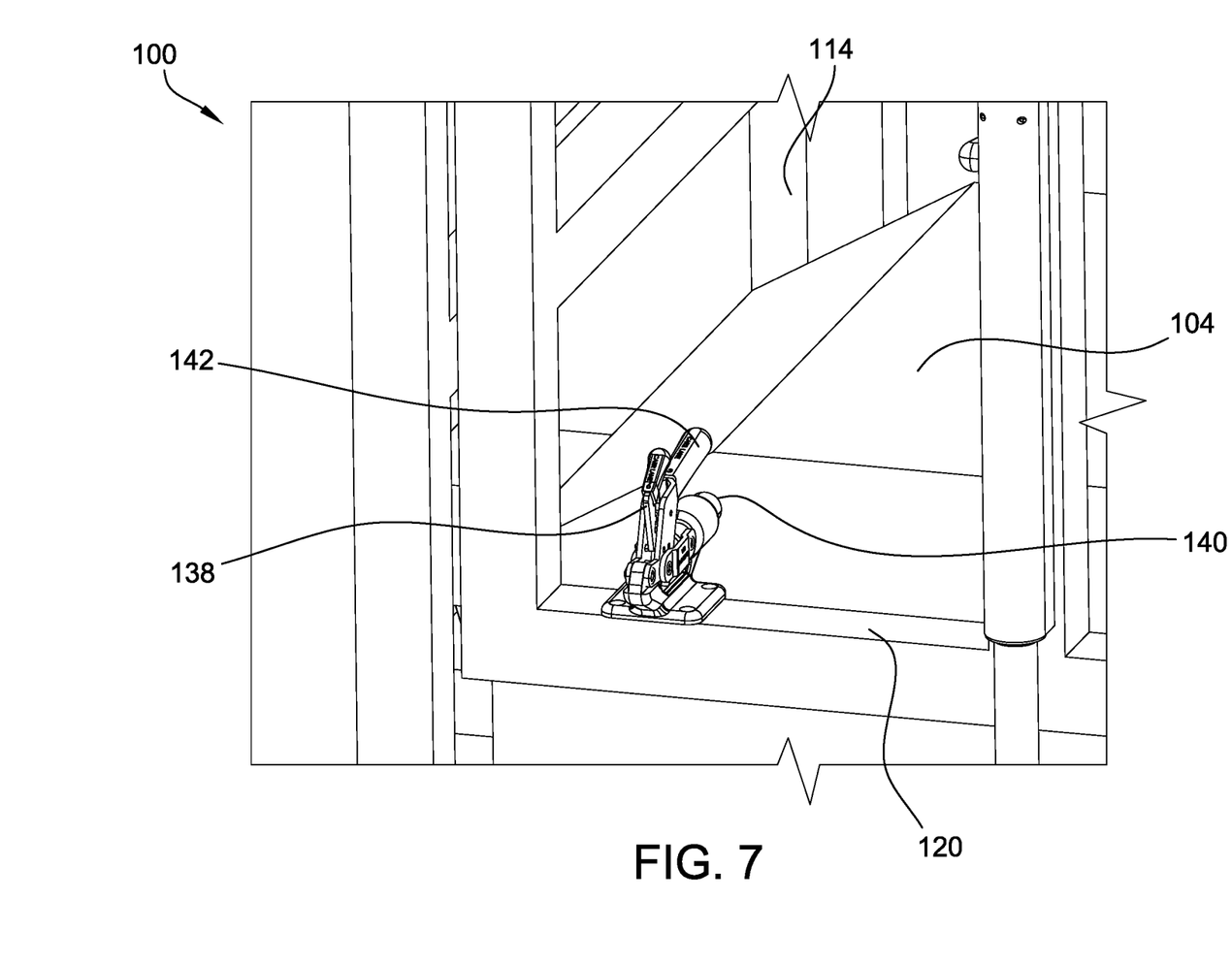
FIG. 7 is a perspective view of the material transport system of FIG. 1 illustrating a portion of the transport device secured to the AGV.
Figure 8:
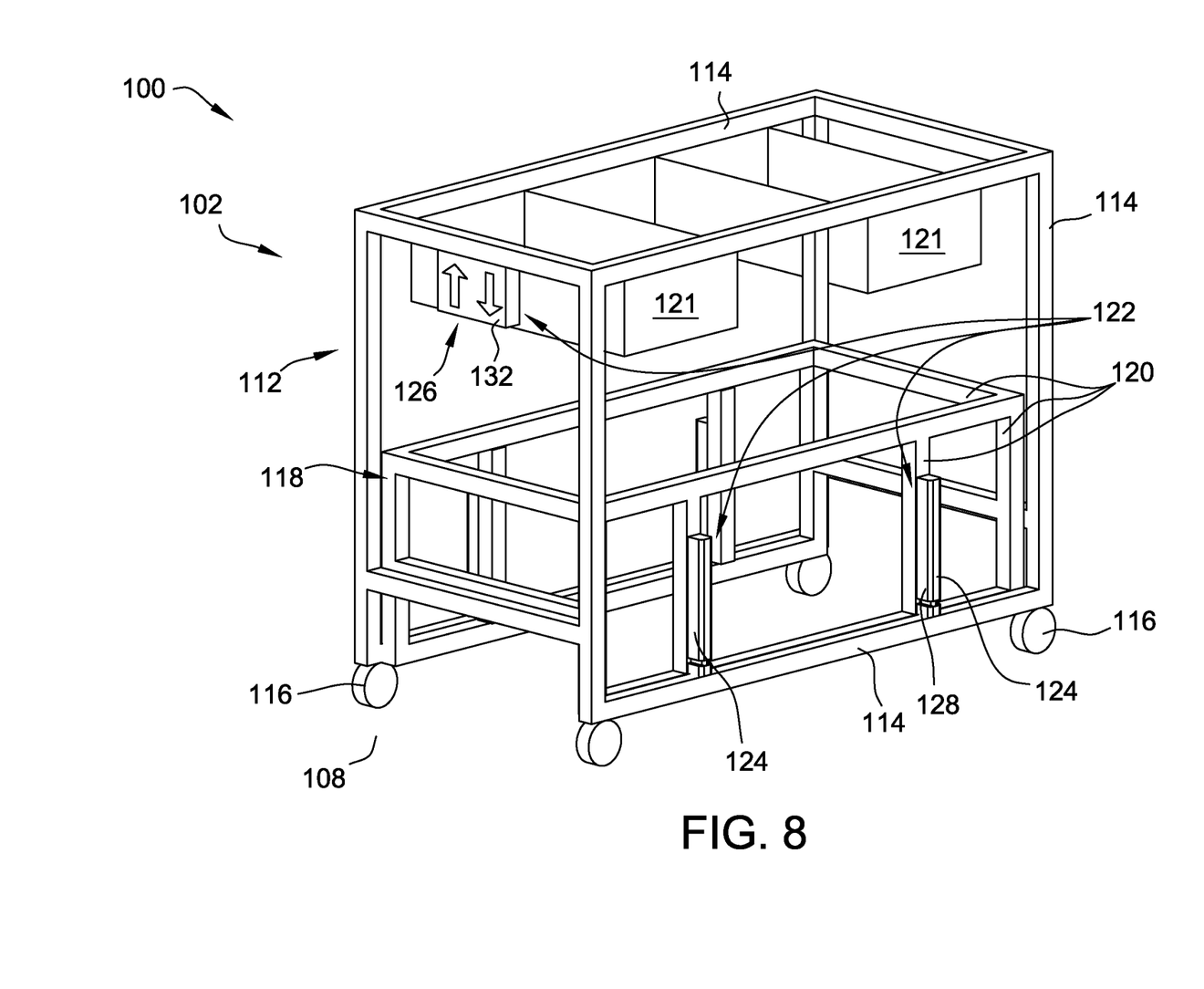
FIG. 8 is a perspective view of material transport system of FIG. 1 illustrating the transport device.

FIG. 1 is a perspective view of a material transport system 100 illustrating a transport device 102 and an automated guided vehicle (AGV) 104 with AGV 104 in a first position 106 on a floor surface 108, FIG. 2 is a front view of material transport system 100 illustrating AGV 104 in the first positon 106, and FIG. 3 is a side view of material transport system 100 illustrating AGV 104 in the first positon 106. Furthermore, FIG. 4 is a perspective view of material transport system 100 illustrating AGV 104 in a second positon 110 spaced from floor surface 108, FIG. 5 is a front view of material transport system 100 illustrating AGV 104 in the second positon 110, and FIG. 6 is a side view of material transport system 100 illustrating AGV 104 in the second positon 110. Further, FIG. 7 is a perspective view of the material transport system of FIG. 1 illustrating a portion of transport device 102 secured to AGV 104, and FIG. 8 is a perspective view of transport device 102 by itself.

In one example, material transport system 100 includes transport device 102 and AGV 104. As described herein, AGV 104 follows a predetermined path on floor surface 108 as it moves about delivering or picking up materials at various locations within a manufacturing facility. Transport device 102 is coupled to AGV 104 and functions to lift AGV 104 off of floor surface 108 for the purpose of moving AGV 104 to a desired location or for performing maintenance on AGV 104. In some examples, AGV 104 follows a predetermined path on floor surface without being attached to transport device. In such a configuration, when it is desired to move AGV 104 from the predetermined path, a technician will retrieve transport device 102 and secure it to AGV 104. In other examples, transport device 102 is attached to AGV 104 as AGV 104 travels along the predetermined path. As shown in the figures, transport device 102 includes a first frame 112 having a plurality of first frame members 114 and a plurality of wheels 116 that are coupled to first frame members 114. In one example, plurality of wheels 116 contact floor surface 108 continuously whether AGV 104 is in the first position 106 or the second position 110. In another implementation, when AGV 104 is in the first position 106 and is performing as desired, wheels 116 are lifted from floor surface 108.

Transport device 102 also includes a second frame 118 positioned within first frame 112 and configured to move vertically within first frame 112. As such, the size and shape of second frame 118 is constrained by the boundaries of first frame 112. Second frame 118 also includes a plurality of second frame members 120 and is optionally configured to mechanically engage AGV 104 such that AGV 104 moves with second frame 118 within first frame 112. In one example, first frame 112 and second frame 118 are substantially box-shaped such that transport device 102 forms a cart. As shown, transport device 102 may be configured to include at least one storage device 121 supported by at least one of first frame 112 and/or second frame 118. For example, FIGS. 1-3 illustrate a pair of storage devices 121 supported by first frame 112. Storage devices 121 may be used to store materials such as component parts and/or tools to be used at various locations along the predetermined route followed by AGV 104.

As shown in FIGS. 1-6, transport device 102 further includes a lifting system 122 that is coupled to the first frame 112 and to the second frame 118 and is configured to slidably move second frame 118 with respect to first frame 112. Specifically, lifting system 122 moves second frame 118 and AGV 104 with respect to first frame 112 between first position 106 and second position 110. More specifically, lifting system 122 moves second frame 118 and AGV 104 with respect to first frame 112 between first position 106, where AGV 104 contacts floor surface 108, and second position 110, where the AGV is spaced from floor surface 108. In one example, first frame 112 is connected to second frame 118 via lifting system 122. In another example, first frame 112 is connected to second frame 118 by a means independent of lifting system 122, for example, by guide rails.

In one example, lifting system 122 includes a hydraulic system that includes a plurality of actuators 124 and a control device 126 configured to control operation of plurality of actuators 124. Plurality of actuators 124 are coupled to first frame 112 and to second frame 118. Specifically, each actuator of plurality of actuators 124 includes a fixed housing 128 and an extension rod 130 (shown in FIGS. 4-6) slidably coupled within fixed housing 128. Each fixed housing 128 is coupled to a second frame member 120 such that the corresponding extension rod 130 engages a first frame member 114. In such a configuration, lifting system 122 moves second frame 118 and AGV 104 vertically within first frame 112 between the first position 106 and the second position 110. Specifically, upon receiving input from a technician at control device 126, extension rods 130 extend out from fixed housing 128 to cause second frame 118 and AGV 104 to slide vertically upward within first frame 112 and lift AGV 104 off of floor surface 108. Although shown and described herein as a hydraulic system, lifting system 122 includes any type of system or apparatus that is operable to move second frame 118 within first frame 112. For example, and without limitation, lifting system 122 may include an electronical actuation system, a pneumatic actuation system, or a manual cable and pulley system. Furthermore, in one example, second frame 118 may travel on rails along first frame 112.

In one example, as shown in FIGS. 1-3, lifting system 122 includes a control device 126 consisting of an electronic controller 132. In such a configuration, electronic controller 132 controls operation of actuators 124 to automatically lift AGV 104 into the second position 110 upon a determination that a battery remaining percentage of AGV 104 is beneath a predetermined threshold that is programmable by a user. Electronic controller 132 may be communicatively coupled to AGV 104 such that electronic controller 132 controls operation of actuators 124 to automatically lifts AGV 104 into the second position 110 when electronic controller 132 determines AGV 104 has a battery remaining percentage, for example below 10%. As described herein, the predetermined battery remaining threshold at which control device 126 controls operation of actuators 124 to lift AGV 104 into the second position 110 may be programmed into control device 126 by a user.

In another example, as shown in FIGS. 4-6, lifting system 122 includes a control device 126 consisting of a manual crank 134. In either configuration, the communication lines that connect control device 126 to the plurality of actuators 124 extend along first frame members 114 and second frame members 120. In one example, first frame members 114 and second frame members 120 are formed from an extruded aluminum containing a number of grooves (not shown) and the communication lines are positioned within the grooves. In some examples, trim pieces (not shown) can be attached to first frame members 114 and second frame members 120 to cover the communication lines. Furthermore, the trim pieces for each material transport system 100 within the manufacturing facility may be a different color to indicate a certain payload or direction of travel.

Referring now to primarily FIGS. 3, 5, and 7, transport device 102 also includes a plurality of clamps 138 coupled to second frame 118. In operation, each clamp 138 engages a corresponding lift point 140 on AGV 104 to mechanically secure AGV 104 to second frame 118 when AGV 104 is moved from the first position 106 to the second position 110. Once engaged, each clamp 138 includes a locking mechanism 142 that prevents clamp 138 from withdrawing out of lift point 140. As best shown in FIG. 7, lift point 140 is an opening defined in AGV 104 that is aligned with clamp 138 when both AGV 104 and second frame 118 are in the first position 106. It may be advantageous for transport device 102 to remain coupled to AGV 104 even when AGV 104 is operating normally. In such a situation, clamps 138 engage lift points 140 such that AGV 104 tows transport device 102 along its predetermined route. When AGV 104 needs to be moved from its route for any reason, a technician operates control device 126 to cause extension rods 130 of actuators 124 to press down on first frame 112, which causes second frame 118 and AGV 104 to rise vertically away from floor surface 108 to the second position 110. When AGV 104 is in the second position 110, the technician can easily push transport device 102, with AGV 104 attached, to a desired location that is off the predetermined route.

Referring now to FIG. 8, transport device 102 is illustrated without AGV 104. The components of transport device 102 were described in preceding figures. As described herein, in certain implementations, transport device 102 is not always together with AGV 104, and that in such implementations users of transport device 102 are able to take transport device 102 out into the manufacturing facility to gather an AGV 104 that needs to be removed from service for whatever reasons.

The implementations described herein relate to automated guided vehicles and, more particularly, a transport device for lifting automated guided vehicles (AGVs) from a floor surface. More specifically, in the exemplary implementation, the transport device includes a first frame including a plurality of first frame members and a plurality of wheels coupled to the plurality of first frame members, wherein the plurality of wheels are configured to contact the floor surface. The transport device also includes a second frame including a plurality of second frame members, wherein the second frame is configured to mechanically engage the AGV. The transport device further includes a lifting system configured to move the second frame and the AGV with respect to the first frame between a first position where the AGV contacts the floor surface and a second position where the AGV is spaced from the floor surface.

The transport device provides a safe and ergonomic way to lift and move the AGV off of its predetermined route. As described herein, the AGV may need to be moved to allow access for emergency vehicles, to perform maintenance on the AGV, or to change the predetermined route due to a reconfiguration of the work floor. The clamps that attach the transport device to the AGV are easily operable to remove the transport device from the AGV, or to allow the transport device to remain connected to the AGV as the AGV travels along its route. When the transport device remains with the AGV, the transport device can be used to store components and tools for delivery and is easily seen to prevent accidental contact with workers. Additionally, the control device that controls operation of the actuators can be easily manipulated with one hand by a single technician. Such ease of operation facilitates easily and quickly removing the AGV from the route to allow emergency ingress/egress or to quickly perform AGV maintenance, such as removing debris from the AGV wheels.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A transport device for lifting an automated guided vehicle (AGV) from a floor surface, the transport device comprising:
    a first frame comprising a plurality of first frame members and a plurality of wheels coupled to the plurality of first frame members, wherein the plurality of wheels are configured to contact the floor surface;
    a second frame comprising a plurality of second frame members, wherein the second frame is configured to mechanically engage the AGV; and
    a lifting system configured to move the second frame and the AGV with respect to the first frame between a first position where the AGV contacts the floor surface and a second position where the AGV is spaced from the floor surface.

2. The transport device of claim 1, wherein the second frame is positioned within the first frame.

3. The transport device of claim 1, wherein the lifting system moves the second frame and the AGV vertically within the first frame between the first position and the second position.

4. The transport device of claim 1, wherein the lifting system comprises:
    a plurality of actuators coupled to the first frame and the second frame; and
    a control device configured to control operation of the plurality of actuators.

5. The transport device of claim 4, wherein the control device comprises a manual crank.

6. The transport device of claim 4, wherein the control device comprises an electronic controller.

7. The transport device of claim 6, wherein the electronic controller is configured to control operation of the plurality of actuators to automatically lift the AGV into the second position upon a determination that a battery remaining percentage of the AGV is beneath a predetermined threshold.

8. The transport device of claim 1, further comprising a plurality of clamps coupled to the second frame, wherein the plurality of clamps are configured to engage a corresponding lift point on the AGV to secure the AGV to the second frame when the AGV is moved from the first position to the second position.

9. The transport device of claim 1, further comprising at least one storage device supported by at least one of the first frame and the second frame.

10. A material transport system comprising:
   an automated guided vehicle (AGV) configured to follow a predetermined path on a floor surface;
   a first frame comprising a plurality of first frame members and a plurality of wheels coupled to the plurality of first frame members, wherein the plurality of wheels are configured to contact the floor surface;
   a second frame positioned within the first frame and coupled to the AGV; and
   a lifting system coupled to the first frame and to the second frame, wherein the lifting system is configured to move the second frame and the AGV with respect to the first frame between a first position where the AGV contacts the floor surface and a second position where the AGV is spaced from the floor surface.

11. The material transport system of claim 10, wherein the lifting system moves the second frame and the AGV vertically within the first frame between the first position and the second position.

12. The material transport system of claim 10, wherein the lifting system comprises:
   a plurality of actuators coupled to the first frame and the second frame; and
   a control device configured to control operation of the plurality of actuators.

13. The material transport system of claim 12, wherein the control device comprises a manual crank.

14. The material transport system of claim 12, wherein the control device comprises an electronic controller.

15. The material transport system of claim 10, wherein the AGV comprises a plurality of lift points, the material transport system further comprising a plurality of clamps coupled to the second frame, wherein the plurality of clamps are configured to engage a corresponding lift point of the plurality of lift points to secure the AGV to the second frame.

16. The material transport system of claim 10, further comprising at least one storage device supported by at least one of the first frame and the second frame.

17. A method of assembling a material transport system for transporting material along a floor surface, the method comprising:
   positioning a second frame within a first frame;
   connecting a lifting system to the first frame and to the second frame; and
   mechanically engaging the second frame to an automated guided vehicle (AGV), wherein the lifting system is configured to move the second frame and the AGV with respect to the first frame between a first position where the AGV contacts the floor surface and a second position where the AGV is spaced from the floor surface.

18. The method of claim 17, wherein connecting the lifting system comprises connecting the lifting system to the first frame and to the second frame such that the lifting system moves the second frame and the AGV vertically within the first frame between the first position and the second position.

19. The method of claim 17, further comprising:
   coupling a plurality of actuators to the first frame and to the second frame; and
   coupling a control device to the first frame, the control device configured to control operation of the plurality of actuators.

20. The method of claim 17, wherein coupling the second frame to the AGV comprises:
   coupling a plurality of clamps to the second frame; and
   engaging a lift point on the AGV with a corresponding clamp of the plurality of clamps to secure the AGV to the second frame.

* * * * *